US009531957B1

(12) United States Patent
George et al.

(10) Patent No.: US 9,531,957 B1
(45) Date of Patent: Dec. 27, 2016

(54) SYSTEMS AND METHODS FOR PERFORMING REAL-TIME IMAGE VECTORIZATION

(71) Applicant: Wipro Limited, Bangalore (IN)

(72) Inventors: Tomson Ganapathiplackal George, Paika (IN); Sudheesh Joseph, Kochi (IN)

(73) Assignee: WIPRO LIMITED, Bangalore (IN)

( * ) Notice: Subject to any disclaimer, the term of this patent is extended or adjusted under 35 U.S.C. 154(b) by 17 days.

(21) Appl. No.: 14/826,227

(22) Filed: Aug. 14, 2015

(30) Foreign Application Priority Data

Jun. 25, 2015 (IN) ............................ 3209/CHE/2015

(51) Int. Cl.
| | |
|---|---|
| H04N 5/228 | (2006.01) |
| H04N 5/232 | (2006.01) |
| G06T 7/00 | (2006.01) |
| G06T 3/00 | (2006.01) |
| G06T 7/40 | (2006.01) |

(52) U.S. Cl.
CPC ............ *H04N 5/23293* (2013.01); *G06T 3/00* (2013.01); *G06T 7/0081* (2013.01); *G06T 7/0083* (2013.01); *G06T 7/408* (2013.01); G06T 2207/20104 (2013.01)

(58) Field of Classification Search
CPC .................................................. H04N 5/23293
USPC ....................................................... 348/222.1
See application file for complete search history.

(56) References Cited

U.S. PATENT DOCUMENTS

| | | | |
|---|---|---|---|
| 2009/0175411 A1 | 7/2009 | Gudmundson et al. | |
| 2009/0262230 A1* | 10/2009 | Sugiura ................ | G06F 3/0488 348/333.11 |
| 2010/0232646 A1* | 9/2010 | Takeuchi ............... | G06T 7/204 382/103 |

(Continued)

FOREIGN PATENT DOCUMENTS

| | | |
|---|---|---|
| JP | 2011086190 | 4/2011 |
| WO | WO 02/057955 | 7/2002 |

OTHER PUBLICATIONS

European Search Report issued Oct. 5, 2016 in European Patent Office in counterpart European Patent No. Application 15201796.8. 7 pages.

*Primary Examiner* — Usman Khan
(74) *Attorney, Agent, or Firm* — Finnegan, Henderson, Farabow, Garrett & Dunner, LLP (57) ABSTRACT

Systems and methods for performing real-time image vectorization are disclosed. In one embodiment, the method comprises receiving a vectorized base image. The method further comprises displaying the vectorized base image on a display screen of the camera. The method further comprises obtaining a user feedback on the vectorized base image from a user. The user feedback comprises user selection of at least one non-vectorized subsection in the vectorized base image. The method further comprises receiving a subsection image, from the camera, comprising the at least one non-vectorized subsection selected based on the user feedback. The further comprises performing vectorization on the subsection image to obtain vectorized subsections. The method further comprises overlaying the vectorized subsections on the at least one non-vectorized subsection of the vectorized base image. The method further comprises merging the vectorized base image with the vectorized subsections to obtain an output vectorized image.

18 Claims, 8 Drawing Sheets

(56) References Cited

U.S. PATENT DOCUMENTS

| | | |
|---|---|---|
| 2011/0157406 A1 | 6/2011 | Tauchi |
| 2012/0307156 A1* | 12/2012 | Matsuno ............... H04N 5/144 |
| | | 348/597 |
| 2014/0254951 A1 | 9/2014 | Salvador et al. |

* cited by examiner

SYSTEMS AND METHODS FOR PERFORMING REAL-TIME IMAGE VECTORIZATION

PRIORITY CLAIM

This U.S. patent application claims priority under 35 U.S.C. §119 to India Application No. 3209/CHE/2015, filed Jun. 25, 2015. The entire contents of the aforementioned application are incorporated herein by reference.

TECHNICAL FIELD

This disclosure relates generally to image vectorization and more particularly to systems and methods for performing real-time image vectorization.

BACKGROUND

With advent of smart phones and mobile applications, image vectorization is gaining popularity these days. The image vectorization may be defined as conversion of raster graphics in an image to vector graphics. In an example, vectorization of an image may involve detecting/processing various image details like edges, and homogenous color regions in image. The vectorization may enable a user to select subsections present in a vectorized image. Thereafter, the user may perform desired operations on the selected subsections. One of the desired operations may be coloring of the subsections. In an example, the user may select a window from a vectorized image of his/her house and apply a color to the window to see how it appears in that particular color. Once an image is captured by a camera, the image may be processed using various image processing techniques, such as an edge detection technique, a line/specific-shape detection technique, and a region detection technique before converting into a reasonable vectorized image. Further, it may be possible that some of the images may not be vectorized up to a desired quality due to absence of required detail/orientation which enables the best possible vectorization. In such case the user may not be able to select the subsections, which are not vectorized, to perform the desired operation.

SUMMARY

In one embodiment, a method for performing real-time image vectorization is disclosed. The method comprises receiving, by a processor, a vectorized base image. The method further comprises displaying the vectorized base image on a display screen of the camera. The method further comprises obtaining a user feedback on the vectorized base image from a user. The user feedback comprises user selection of at least one non-vectorized subsection in the vectorized base image. The method further comprises receiving a subsection image, from the camera, comprising the at least one non-vectorized subsection selected based on the user feedback. The further comprises performing vectorization on the subsection image to obtain vectorized subsections. The method further comprises overlaying the vectorized subsections on the at least one non-vectorized subsection of the vectorized base image. The method further comprises merging the vectorized base image with the vectorized subsections to obtain an output vectorized image.

In another embodiment, a system for performing real-time image vectorization is disclosed. The system includes at least one processors and a computer-readable medium. The computer-readable medium stores instructions that, when executed by the at least one processor, cause the at least one processor to perform operations comprising receiving a vectorized base image. The operations further comprise displaying the vectorized base image on a display screen of the camera. The operations further comprise obtaining a user feedback on the vectorized base image from a user. The user feedback comprises user selection of at least one non-vectorized subsection in the vectorized base image. The operations further comprise receiving a subsection image, from the camera, comprising the at least one non-vectorized subsection selected based on the user feedback. The operations further comprise performing vectorization on the subsection image to obtain vectorized subsections. The operations further comprise overlaying the vectorized subsections on the at least one non-vectorized subsection of the vectorized base image. The operations further comprise merging the vectorized base image with the vectorized subsections to obtain an output vectorized image.

In another embodiment, a non-transitory computer-readable storage medium for performing real-time image vectorization is disclosed, which when executed by a computing device, cause the computing device to perform operations comprising receiving a vectorized base image. The operations further comprise displaying the vectorized base image on a display screen of the camera. The operations further comprise obtaining a user feedback on the vectorized base image from a user. The user feedback comprises user selection of at least one non-vectorized subsection in the vectorized base image. The operations further comprise receiving a subsection image, from the camera, comprising the at least one non-vectorized subsection selected based on the user feedback. The operations further comprise performing vectorization on the subsection image to obtain vectorized subsections. The operations further comprise overlaying the vectorized subsections on the at least one non-vectorized subsection of the vectorized base image. The operations further comprise merging the vectorized base image with the vectorized subsections to obtain an output vectorized image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digits) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

In one conventional approach, a base image is obtained and vectorization is performed to vectorize objects present in the base image. In some cases, where the base image is not of desired quality or orientation, some objects in the base image may not get vectorized. Therefore, the base image is not vectorized completely and a user may not be able to select the non-vectorized objects to perform desired operations.

The present subject matter discloses systems and methods for performing real-time vectorization. The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

In the present subject matter, to perform real-time vectorization of a base image, a vectorization mode may be initiated by a user through a hand-held device comprising a camera. In the vectorization mode, the base image may be captured by the camera and provided for vectorization. In one implementation, the base image may be obtained from an image repository having previously captured images. The base image may comprise subsections. The subsections may be understood as a region having objects in the image. For example, an image of a building may have subsections having subjects, such as windows, pillars, doors, architecture, and roof of the building. For accurate vectorization of the subsections, these objects should be properly captured and are in proper orientation.

In operations, a vectorized base image in which all the subsections are not vectorized may be obtained. In an example, the base image may be obtained and then vectorized to obtain the vectorized base image. The vectorized base image may be displayed on a display screen of a device. Thereafter, a user feedback may be received on the vectorized base image from the user. The user feedback may indicate at least one subsection that is not vectorized in the vectorized base image. Such subsections which are not vectorized may be referred to as non-vectorized subsections hereinafter. Subsequently, a subsection image corresponding to the at least one non-vectorized subsections may be received from the camera for vectorization. Once the subsection image comprising the non-vectorized subsections is vectorized, the subsection image is merged with the vectorized base image to obtain an output vectorized image which will have the vectorized subsections selected by the user. In this manner, real-time vectorization of the image is performed based on the user feedback.

Working of the systems and methods for performing real-time vectorization is described in conjunction with FIGS. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
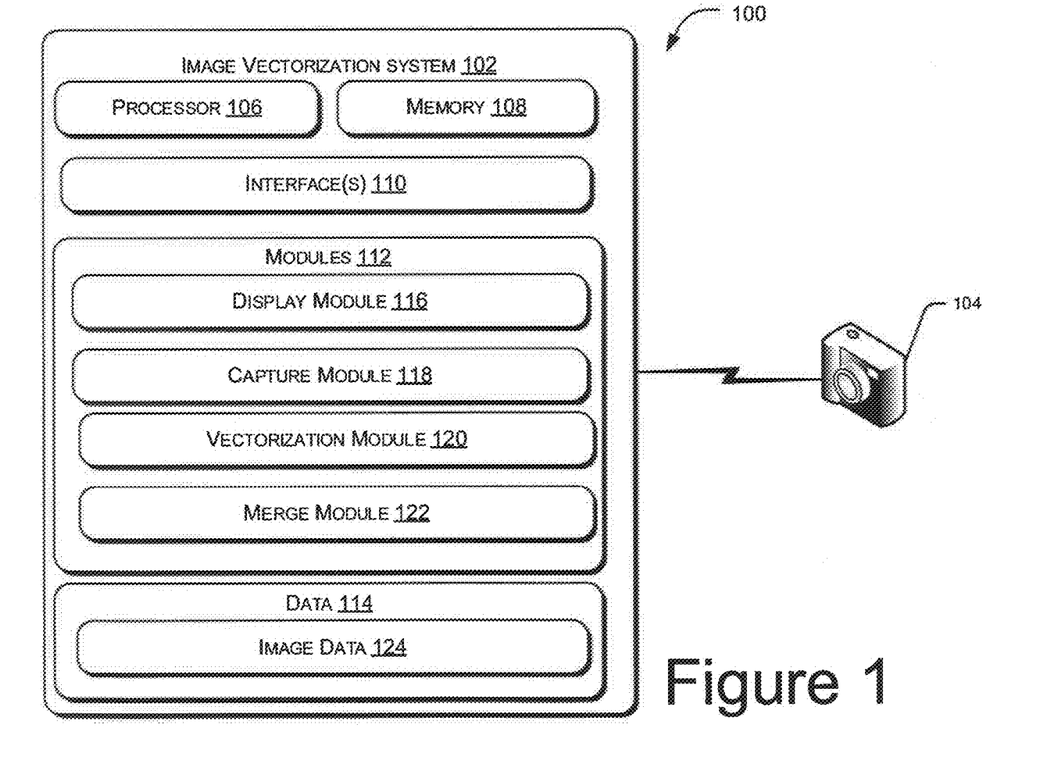
FIG. 1 illustrates an exemplary network implementation comprising an image vectorization system, in accordance with some embodiments of the present disclosure.

FIG. 1 illustrates an exemplary network environment 100 comprising an image vectorization system 102, in accordance with some embodiments of the present disclosure. As shown in FIG. 1, the image vectorization system 102 is communicatively coupled to a camera 104. In an example, the camera 104 may be integrated with various devices, such as a laptop, a personal computer, a laptop, a mobile phone, and a wearable device. Hereinafter, the image vectorization system 102 may be interchangeably referred to as a system 102.

The system 102 may be implemented on variety of computing systems. Examples of the computing systems may include a laptop computer, a desktop computer, a tablet, a notebook, a workstation, a mainframe computer, a server, a network server, and the like.

The system 102 may be communicatively coupled to the camera 104 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc. In one implementation, the system 102 and the camera 104 may be present within a single device. For example, the system 102 and the camera 104 may be present in a user device, such as a mobile phone. In such cases, the system 102 and the camera 104 may communicate directly without the presence of any network.

As shown in FIG. 1, the system 102 comprises a processor 106, a memory 108 coupled to the processor 106, and interface(s) 110. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor 106 is configured to fetch and execute computer-readable instructions stored in the memory 108. The memory 108 can include any non-transitory computer-readable medium known in the art including, for example, volatile memory (e.g., RAM), and/or non-volatile memory (e.g., EPROM, flash memory, etc.).

The interface(s) 110 may include a variety of software and hardware interfaces, for example, a web interface, a graphical user interface, etc., allowing the system 102 to interact with the user devices 104. Further, the interface(s) 110 may enable the system 102 respectively to communicate with other computing devices. The interface(s) 110 can facilitate multiple communications within a wide variety of networks and protocol types, including wired networks, for example LAN, cable, etc., and wireless networks such as WLAN, cellular, or satellite. The interface(s) 110 may include one or more ports for connecting a number of devices to each other or to another server.

In one example, the system 102 includes modules 112 and data 114. In one embodiment, the modules 112 and the data 114 may be stored within the memory 108. In one example, the modules 112, amongst other things, include routines, programs, objects, components, and data structures, which perform particular tasks or implement particular abstract data types. The modules 112 and may also be implemented as, signal processor(s), state machine(s), logic circuitries, and/or any other device or component that manipulate signals based on operational instructions. Further, the modules 112 can be implemented by one or more hardware components, by computer-readable instructions executed by a processing unit, or by a combination thereof.

In one implementation, the modules 112 further include a display module 116, a capture module 118, a vectorization module 120, and a merge module 122. In an example, the modules may also comprises other modules. The other modules may perform various miscellaneous functionalities of the system 102. It will be appreciated that such aforementioned modules may be represented as a single module or a combination of different modules.

In one example, the data 114 serves, amongst other things, as a repository for storing data fetched, processed, received and generated by one or more of the modules 112. In one implementation, the data 114 may include image data 124. In one embodiment, the data 114 may be stored in the memory 108 in the form of various data structures. Additionally, the aforementioned data can be organized using data models, such as relational or hierarchical data models. In an example, the data 114 may also comprises other data used to store data, including temporary data and temporary files, generated by the modules 112 for performing the various functions of the system 102.

In operations, when a user wants to perform vectorization of an image, the system 102 may receive an input from the user for initiating a vectorization mode. Once the vectorization mode is initiated, the user may capture a base image through the camera 104. The base image may comprise a plurality of objects. For example, the base image may be an image of a motor vehicle having the plurality of objects, such as tires, a bonnet, a trunk, doors, windows, and a roof. Further, a region or area corresponding each of the plurality of objects may be referred to as a subsection. In this manner, the base image may comprises a plurality of subsections.

Upon obtaining the base image, the system 102 may vectorize the base image based user instructions to obtain a vectorized base image. In some cases, it may be possible that some of the subsections present in the image may not get vectorized due to wrong orientation and/or bad quality of the base image. In such cases, the vectorized base image may comprise vectorized subsections and at least one non-vectorized subsection. In case, all the subsections are vectorized, the system 102 may identify the vectorized base image as an output vectorized image and provide it to the user.

Further, the vectorized base image, comprising the vectorized subsections and the at least one non-vectorized subsections, may be obtained by the system 102 for real-time vectorization of the non-vectorized subsections. In one implementation, the system 102 may directly obtained the vectorized base image from a repository upon receiving the user instructions for vectorization.

Thereafter, the display module 116 may display the vectorized base image on a display screen of the camera 104. Once the vectorized base image is displayed, the user may select at least one subsections, from the non-vectorized subsections, for vectorization. The user selection may be provided as a part of user feedback to the display module 116. In an example, the display module 116 may receive the user feedback having coordinates of the at least one non-vectorized subsection, to be vectorized, in the vectorized base image. In another example, the display module 116 may determine the at least one non-vectorized subsection, to be vectorized, based on a touch-input detected by a touch-sensitive display of the camera 104.

Upon receiving the user feedback comprising the selection of the non-vectorized subsections, the capture module 118 may receive a subsection image, from the camera 104, corresponding to the at least one non-vectorized subsection. The subsection image comprises the at least non-vectorized subsection selected by the user. In an example, the capture module 118 may instruct the camera 104 to capture the subsection image comprising the non-vectorized subsections selected by the user. In another example, the user may control the camera 104 to focus and capture the subsection image comprising the non-vectorized subsections. The subsection image may be then provided to the capture module 118.

Subsequently, the vectorization module 120 may perform vectorization on the subsection image to vectorize the non-vectorized subsections selected by the user. Once the non-vectorized subsections are vectorized, the merge module 122 may overlay the vectorized subsections on the at least one non-vectorized subsections of the vectorized base image. Thereafter, the merge module 122 may merge the vectorized base image with the vectorized subsections to obtain an output vectorized image. In an example, the output vectorized image may comprise the vectorized subsections requested by the user. In case, one of the subsections is still not vectorized, the system 102 may again capture a subsection image to that particular subsection and repeat the process of vectorization and merging to obtain the output vectorized image. Once the user confirms that all the subsections requested by him/her are vectorized, the system 102 may store the output vectorized image in the image data 124. Further, the all the images captured during the real-time vectorization may be stored in the image data 124. In this manner, real-time vectorization of an image is performed based on the user feedback.

In one implementation, the user may select all the non-vectorized subsections simultaneously for vectorization, as explained above. In another implementation, the user may select the non-vectorized subsection one at a time for vectorization. This implementation is discussed in more detail in conjunction with FIGS. 2 (a)-(h).

FIGS. 2(a)-2(h) illustrate exemplary output images obtained during real-time vectorization by the image vectorization system 102, in accordance with some embodiments of the present disclosure.

FIG. 2(*a*) illustrates an exemplary base image 200 to be vectorized by the system 102. As shown in FIG. 2(*a*), the base image 200 is of a house comprising various objects, such as boundary of the house, windows, doors, and pillars.

Figures 2A, 2B:
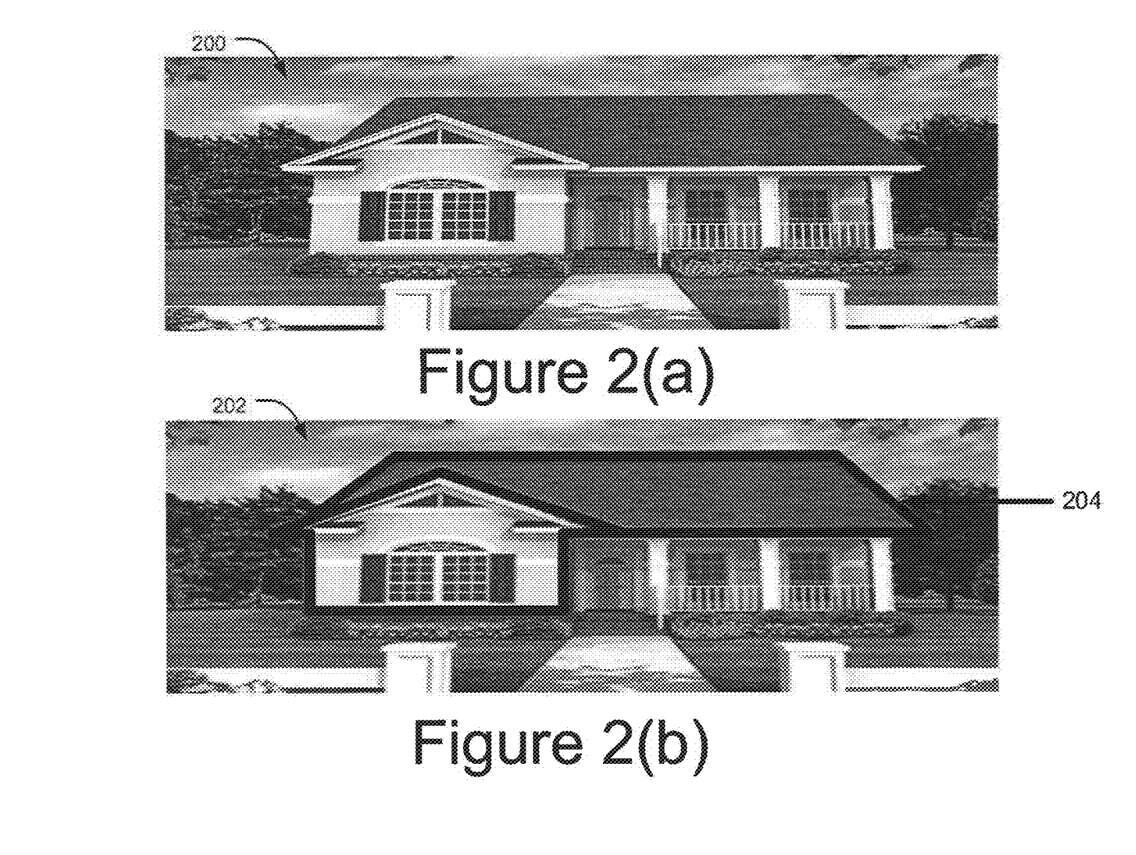
FIGS. 2(a)-2(h) illustrate exemplary output images obtained during real-time vectorization by the image vectorization system, in accordance with some embodiments of the present disclosure.
Figure 2C:
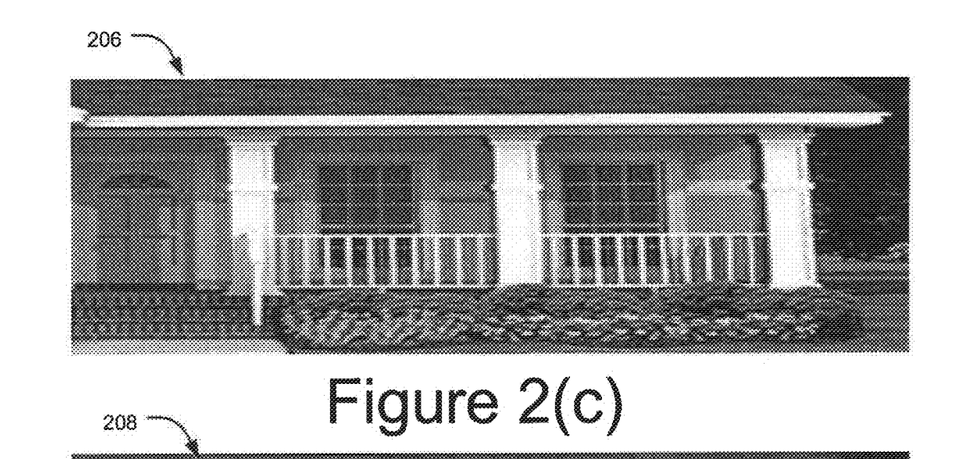

The system 102 receives the base image 200 and performs the vectorization. Thereafter, a first vectorized base image 202 is obtained, as shown in the FIG. 2(*b*). The first vectorized base image 202 illustrates outer boundary 204 of the house that has been vectorized. However, as shown in the FIG. 2(*b*), other parts or objects of the base image are still not vectorized in the first vectorized base image 202. The system 102 may then receive the user feedback on the first vectorized base image 202 by displaying it on the display screen of the camera 104.

Thereafter, the user may select a non-vectorized subsection, i.e., pillar in this case, to be vectorized as shown in FIG. 2(*c*). The FIG. 2(*c*) illustrates a first subsection image 206, comprising the pillars, captured by the camera 104.

Figure 2D:
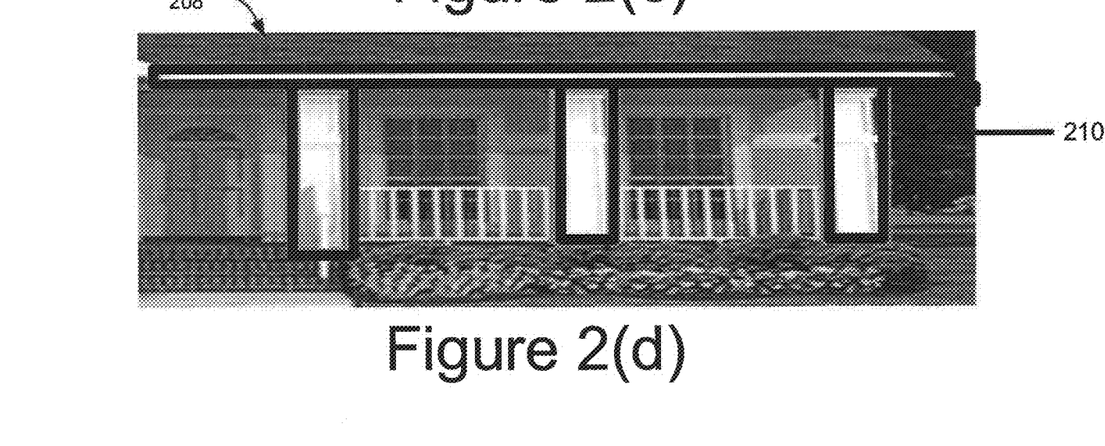

Subsequently, the system 102 may vectorize the first subsection image 206 to obtain a first vectorized subsection image 208. The FIG. 2(*d*) illustrates the pillar 210 that have been vectorized in the first vectorized subsection image 208.

Figure 2E:
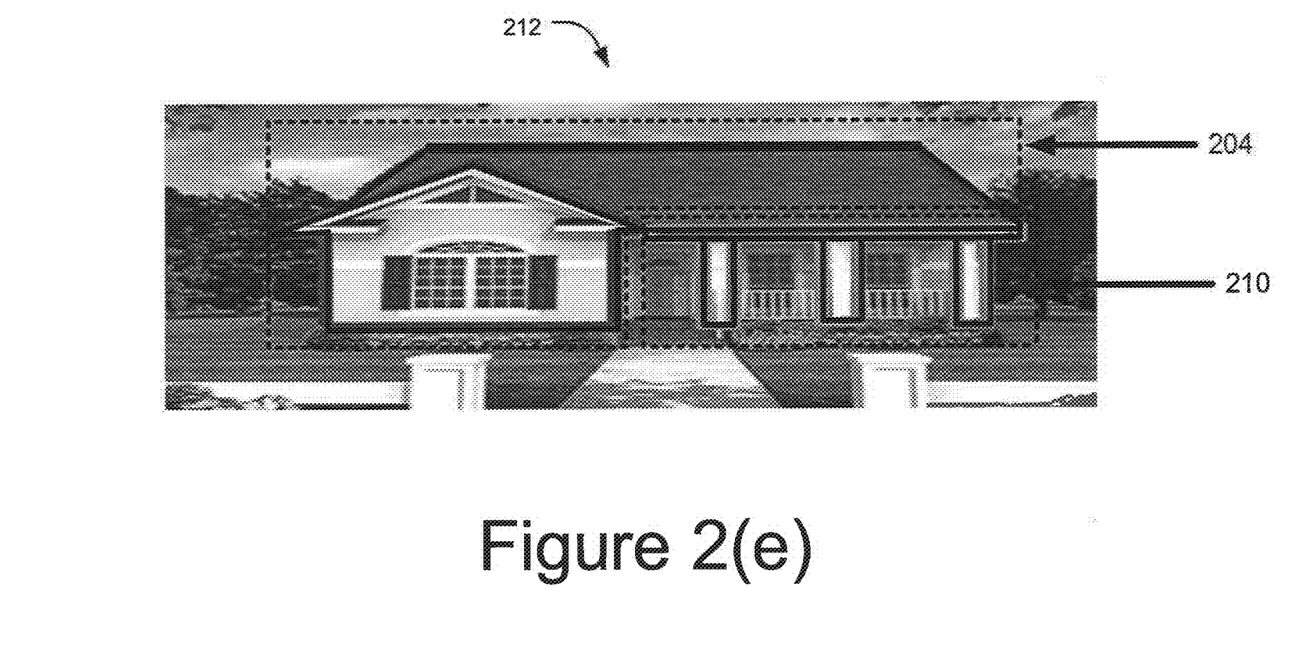

Once the first vectorized base image 202 and the first vectorized subsection image 208 are obtained, the system 102 may overlay the pillars 204, that are vectorized in the first vectorized subsection image 208, on the pillars of the first vectorized base image 202. Subsequently, the first vectorized base image 202 is merged with the first vectorized subsection image 208 to obtain a second vectorized base image 212, as shown in FIG. 2(*e*). The FIG. 2(*e*) is the second vectorized base image 212 having the outer boundary 204 and the pillars 210 that are vectorized.

Figure 2F:
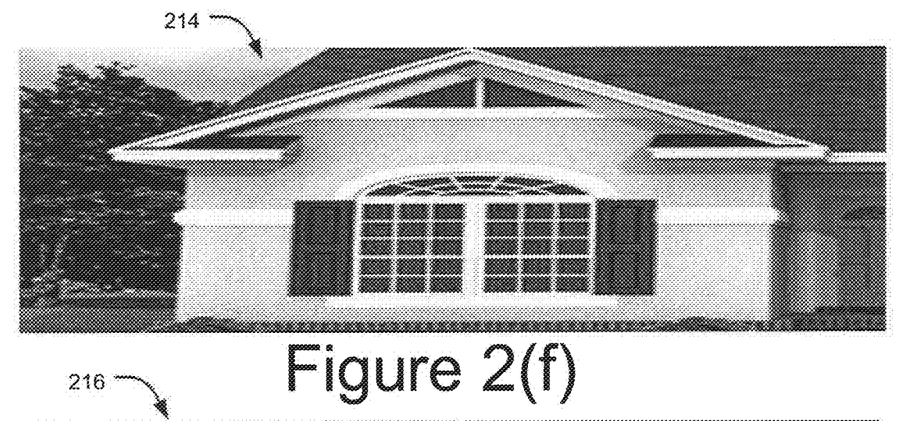
Figure 2G:
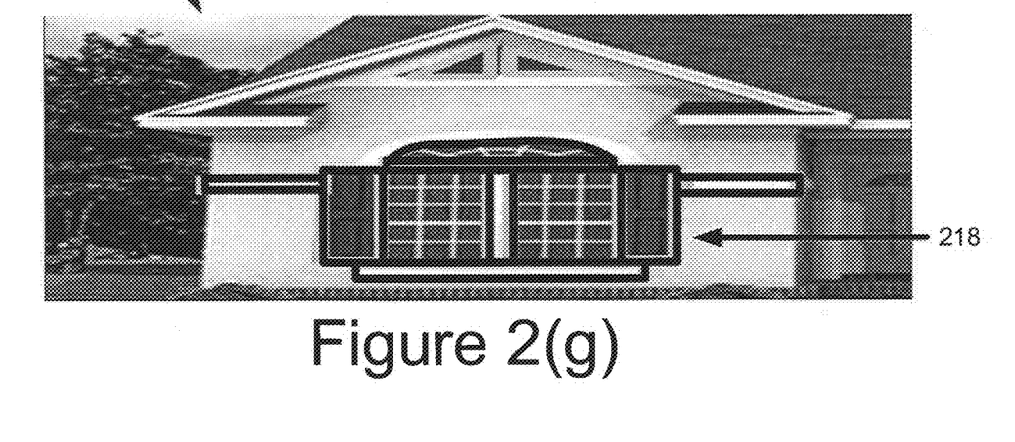
Figure 2H:
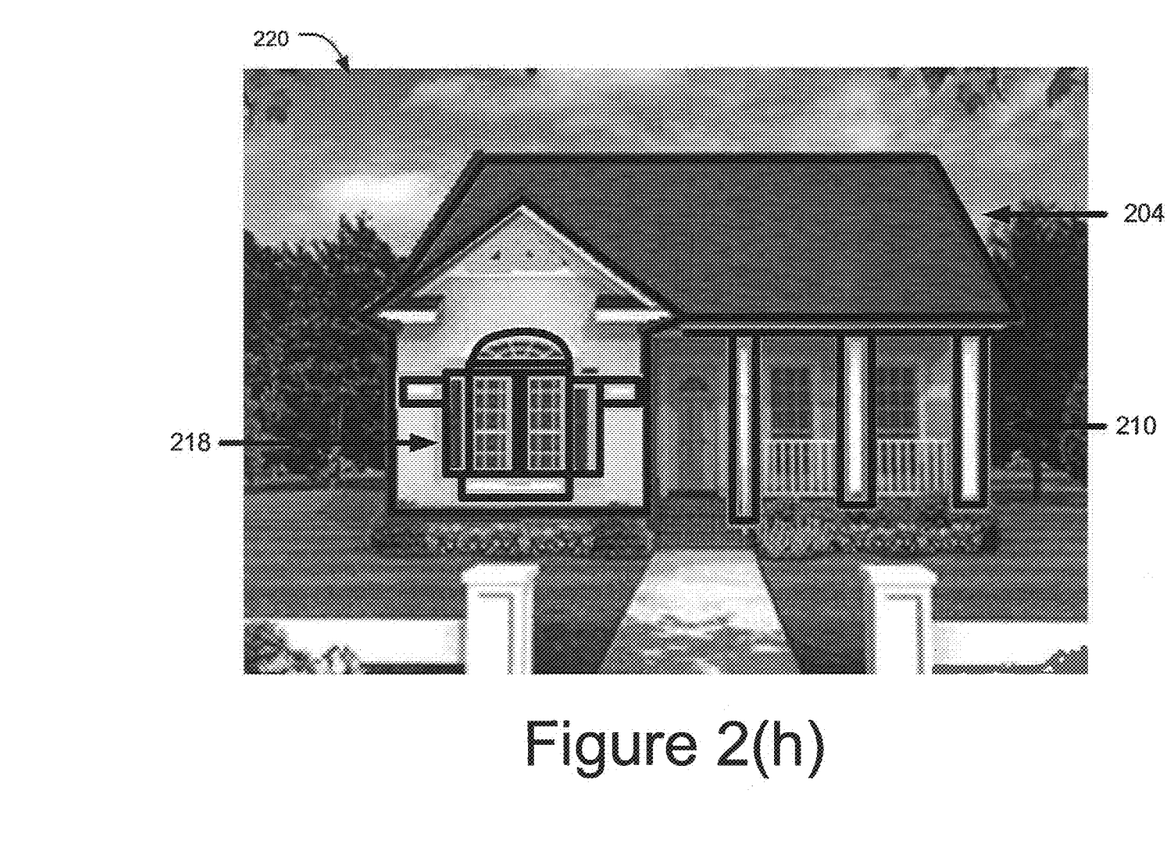

Further, the user may want to vectorize the windows that are not vectorized in both the first vectorized base image 202 and the second vectorized base image 208. The system 102 may then capture a second subsection image 214 based on the user feedback, as shown in FIG. 2(*f*).

Thereafter, the system 102 may perform vectorization on the second subsection image 214 to obtain a second vectorized subsection image 216, as shown in FIG. 2(*g*). The Figure (g) illustrates the second vectorized subsection image 216 comprising the windows 218 that have been vectorized.

Further, the system 102 may merge the second vectorized base image 212 with the second vectorized subsection image 216 to obtain a third vectorized base image 220, as shown in FIG. 2(*h*). The FIG. 2(*h*) illustrates the third vectorized base image comprising the outer boundary 204, the pillars 210, and the windows 218 that are vectorized. Once the system 102 receives the user feedback indicating that there are no more subsections to be vectorized, the system 102 may store the third vectorized base image as the output vectorized image in the image data 124 for future usage.

Thus, the present subject matter discloses a real-time vectorization of the image captured through a device comprising the camera 104. The present subject matter performs the vectorization based on the user feedback and allows user to select the subsections to be vectorized in the image. In this manner, the present subject matter yields better vectorization levels as compared to vectorization of pre-captured images.

Figure 3:
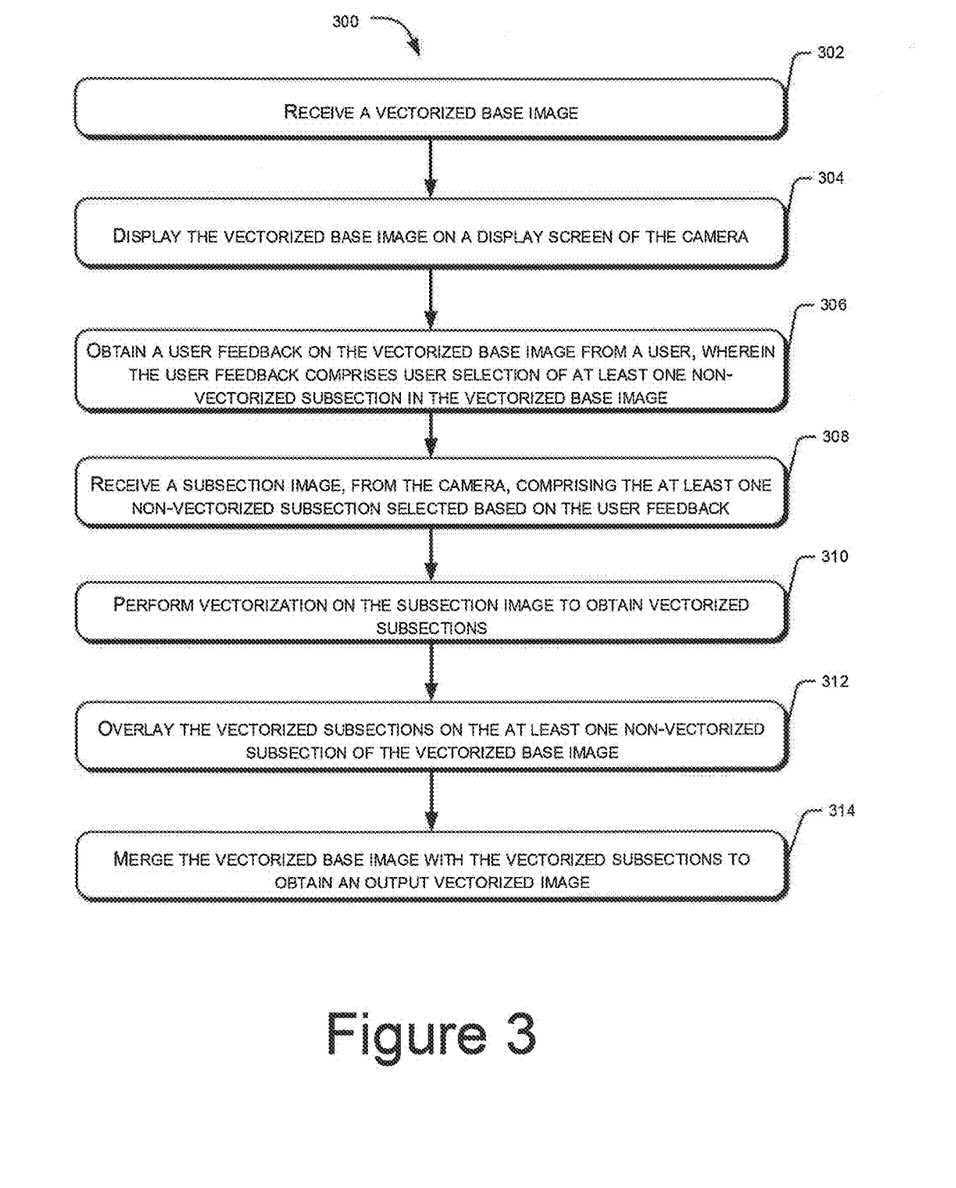
FIG. 3 illustrated an exemplary method for performing real-time vectorization, in accordance with some embodiments of the present disclosure.

FIG. 3 illustrated an exemplary method for performing real-time vectorization, in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to FIG. 3, at block 302, a vectorized base image is received. In an example, the vectorized base image may be received by the display module 116 from the camera 104. In another example, the display module 116 may receive the vectorized base image from the image data 124 having a plurality of vectorized and non-vectorized images. In one implementation, the system 102 may receive a base image instead of the vectorized base image and vectorize the base image before providing to the display module 116. In said implementation, the system 102 may initiate a vectorization mode before capturing or receiving the base image from the camera 104. In an example, the base image may comprise subsections that are not vectorized. Thereafter, the system 102 may perform the vectorization of the base image to obtain the vectorized base image. In an example, the vectorized base image may have vectorized subsections and at least one non-vectorized subsection that is to be vectorized by the system 102.

At block 304, the vectorized base image is displayed on a display screen of the camera 104. In an example, the display module 116 may instruct the camera 104 to display the vectorized base image on the display screen. The display module 116 displays the vectorized image on the display screen to receive a user feedback on the vectorized base image.

At block 306, the user feedback is obtained on the vectorized base image from the user. The user feedback may comprises user selection of at least one non-vectorized subsection in the vectorized base image. In an example, the display module 116 may determine the user selection of the at least one non-vectorized subsection in the vectorized base image by obtaining coordinates of the at least one non-vectorized subsection. For instance, the display module 116 may receive at least three coordinates for defining a subsection/region, such as (−2,−1), (1, 3), and (4, 2) considering center of the vectorized base image as origin. In another example, the display module 116 may obtain the user selection by determining the at least one non-vectorized subsection based on a touch-input detected by a touch-sensitive display of the camera 104. Further, in an example, where the user feedback indicates that there are no more subsections to be vectorized in the vectorized base image, the system 102 may ascertain the vectorized base image as the output vectorized image and store in the image data 124.

At block 308, a subsection image comprising the at least one non-vectorized subsection, selected based on the user feedback, is received from the camera 104. In an example, the capture module 118 may instruct the camera 104 to focus on the at least one non-vectorized subsection selected by the user and capture the subsection image.

At block 310, vectorization on the subsection image is performed to obtain vectorized subsections. In an example, the vectorization module 120 receives the subsection image from the capture module 118 and perform vectorization on the subsection image. In this manner, the vectorization module 120 vectorizes the non-vectorized subsections selected by the user and obtain their corresponding vectorized subsections.

At block 312, the vectorized subsections are overlaid on the at least one non-vectorized subsection of the vectorized base image. In an example, the merge module 122 may overlay the vectorized subsections present in the vectorized subsection image on the subsections of the vectorized base image that are not vectorized.

At block 314, the vectorized base image is merged with the vectorized subsections to obtain an output vectorized image. In an example, the merge module 122 may obtain the vectorized base image and merge with vectorized subsections to obtain the output vectorized image. The output vectorized image may comprise all the subsections, in a vectorized form, that are selected by the user. Further, once it is identified that all the subsections selected by the user are vectorized and are present in the output vectorized image, the merge module 122 may store the output vectorized image in the image data 124 for future usage.

Computer System

Figure 4:
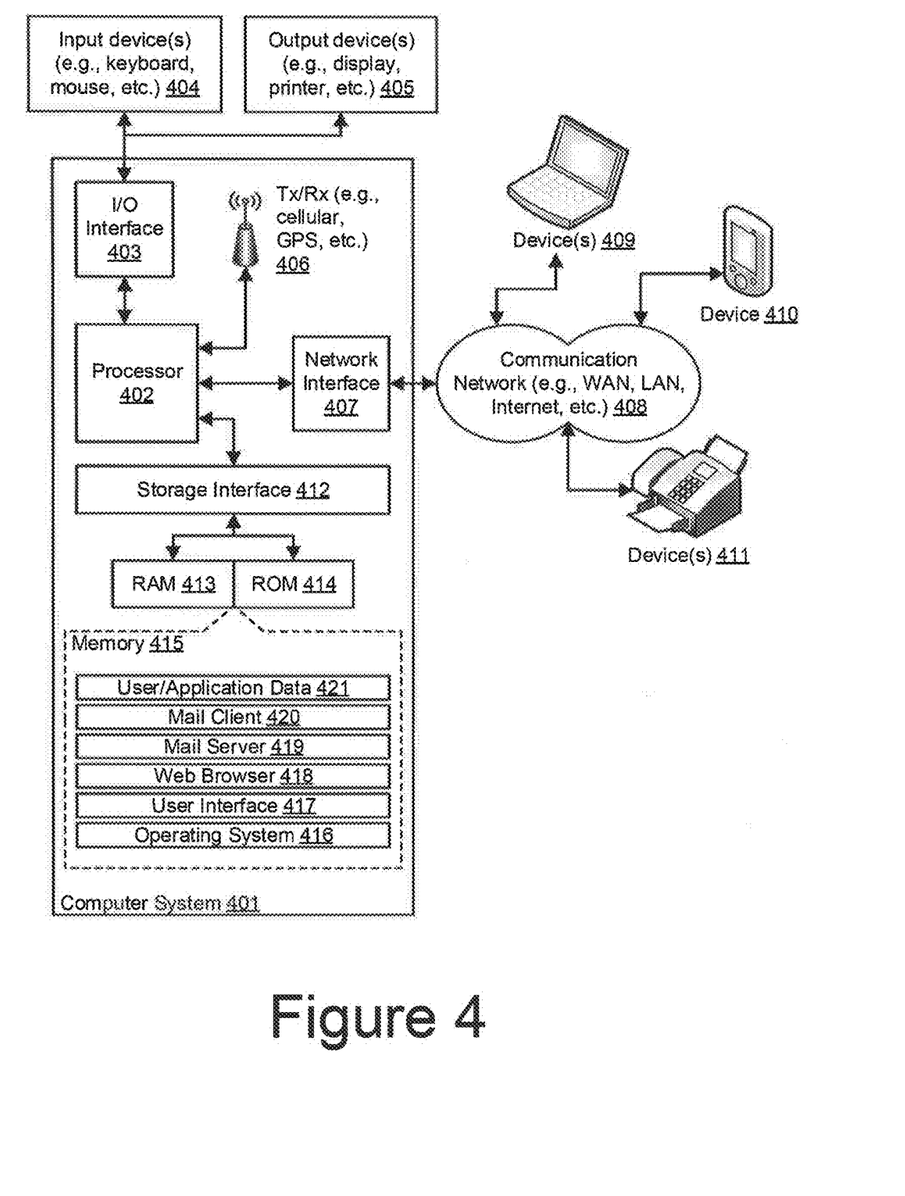
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the display module 116, the capture module 118, the vectorization module 120, and the merge module 122 presented in this disclosure. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interlace (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, strollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc, as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for performing real-time vectorization. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing real-time image vectorization, comprising:
    receiving a vectorized base image;
    displaying, by a processor, the vectorized base image on a display screen of the camera;
    obtaining, by the processor, a user feedback on the vectorized base image from a user, wherein the user feedback comprises user selection of at least one non-vectorized subsection in the vectorized base image;
    receiving a subsection image, from the camera, comprising the at least one non-vectorized subsection selected based on the user feedback;
    performing, by the processor, vectorization on the subsection image to obtain vectorized subsections;
    overlaying, by the processor, the vectorized subsections on the at least one non-vectorized subsection of the vectorized base image; and
    merging, by the processor, the vectorized base image with the vectorized subsections to obtain an output vectorized image.

2. The method as claimed in claim 1, wherein receiving the vectorized base image further comprises:
    initiating a vectorization mode for vectorization of a base image captured by the camera;
    receiving the base image in the vectorization mode, wherein the base image comprises at least one subsection to be vectorized; and
    performing vectorization of the base image to obtain the vectorized base image comprising vectorized subsections and the at least one non-vectorized section.

3. The method as claimed in claim 1, wherein obtaining the user feedback further comprises obtaining coordinates of the at least one non-vectorized subsection in the vectorized base image.

4. The method as claimed in claim 1, wherein obtaining the user feedback further comprises determining the at least one non-vectorized subsection based on a touch-input detected by a touch-sensitive display of the camera.

5. The method as claimed in claim 1 further comprises storing the output vectorized image upon identifying that the at least one non-vectorized subsection selected by the user are vectorized.

6. The method as claimed in claim 1, wherein obtaining the user feedback further comprises ascertaining the vectorized base image as the output vectorized image based on the user feedback.

7. A vectorization system for performing real-time vectorization, comprising:
   a processor; and
   a memory communicatively coupled to the processor, wherein the memory stores processor-executable instructions, which, on execution, causes the processor to perform operations comprising:
      receiving a vectorized base image;
      displaying the vectorized base image on a display screen of the camera;
      obtaining a user feedback on the vectorized base image from a user, wherein the user feedback comprises user selection of at least one non-vectorized subsection in the vectorized base image;
      receiving a subsection image, from the camera, comprising the at least one non-vectorized subsection selected based on the user feedback;
      performing vectorization on the subsection image to obtain vectorized subsections;
      overlaying the vectorized subsections on the at east one non-vectorized subsection of the vectorized base image; and
      merging the vectorized base image with the vectorized subsections to obtain an output vectorized image.

8. The system as claimed in claim 7, wherein operations of receiving the vectorized base image further comprise:
   initiating a vectorization mode for vectorization of a base image captured by the mere;
   receiving the base image in the vectorization mode, wherein the base image comprises at least one subsection to be vectorized; and
   performing vectorization of the base image to obtain the vectorized base image comprising vectorized subsections and the at least one non-vectorized section.

9. The system as claimed in claim 7, wherein operation of obtaining the user feedback further comprise obtaining coordinates of the at least one non-vectorized subsection in the vectorized base image.

10. The system as claimed in claim 7, wherein operations of obtaining the user feedback further comprise determining the at least one non-vectorized subsection based on a touch-input detected by a touch-sensitive display of the camera.

11. The system as claimed in claim 7, wherein operations further comprise storing the output vectorized image upon identifying that the at least one non-vectorized subsection selected by the user are vectorized.

12. The system as claimed in claim 7, wherein operations of obtaining the user feedback further comprise ascertaining the vectorized base image as the output vectorized image based on the user feedback.

13. A non-transitory computer-readable medium storing instructions for performing real-time vectorization, wherein upon execution of the instructions by one or more processors, the processors perform operations comprising:
   receiving a vectorized base image;
   displaying the vectorized base image on a display screen of the camera;
   obtaining a user feedback on the vectorized base image from a user, wherein the user feedback comprises user selection of at least one non-vectorized subsection in the vectorized base image;
   receiving a subsection image, from the camera, comprising the at least one non-vectorized subsection selected based on the user feedback;
   performing vectorization on the subsection image to obtain vectorized subsections;
   overlaying the vectorized subsections on the at least one non-vectorized subsection of the vectorized base image; and
   merging the vectorized base image with the vectorized subsections to obtain an output vectorized image.

14. The computer-readable medium as claimed in claim 13, wherein operations of receiving the vectorized base image further comprise:
   initiating a vectorization mode for vectorization of a base image captured by the camera;
   receiving the base image in the vectorization mode, wherein the base image comprises at least one subsection to be vectorized; and
   performing vectorization of the base image to obtain the vectorized base image comprising vectorized subsections and the at least one non-vectorized section.

15. The computer-readable medium as claimed in claim 13, wherein operation of obtaining the user feedback further comprise obtaining coordinates of the at least one non-vectorized subsection in the vectorized base image.

16. The computer-readable medium as claimed in claim 13, wherein operations of obtaining the user feedback further comprise determining the at least one non-vectorized subsection based on a touch-input detected by a touch-sensitive display of the camera.

17. The computer-readable medium as claimed in claim 13, wherein operations further comprise storing the output vectorized image upon identifying that the at least one non-vectorized subsection selected by the user are vectorized.

18. The computer-readable medium as claimed in claim 13, wherein operations of obtaining the user feedback further comprise ascertaining the vectorized base image as the output vectorized image based on the user feedback.

* * * * *